May 12, 1964  K. A. HOTZ  3,132,539
REVERSING TRANSMISSIONS
Filed Nov. 21, 1960  2 Sheets-Sheet 1
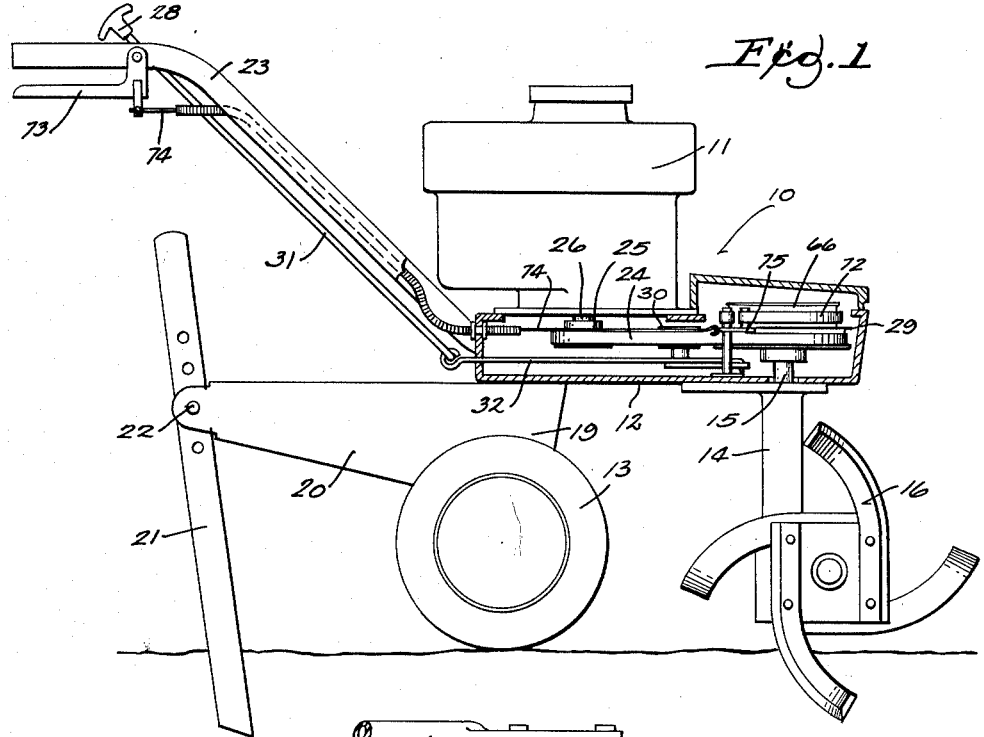
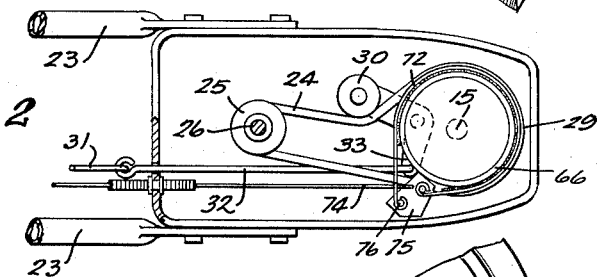
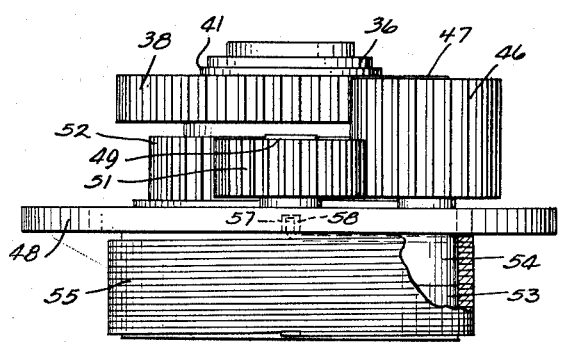
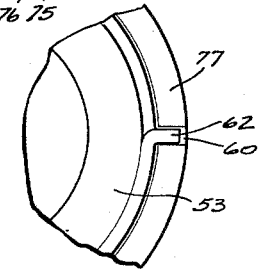
INVENTOR.
KENNETH A. HOTZ
BY
Wheeler, Wheeler & Wheeler
ATTORNEYS

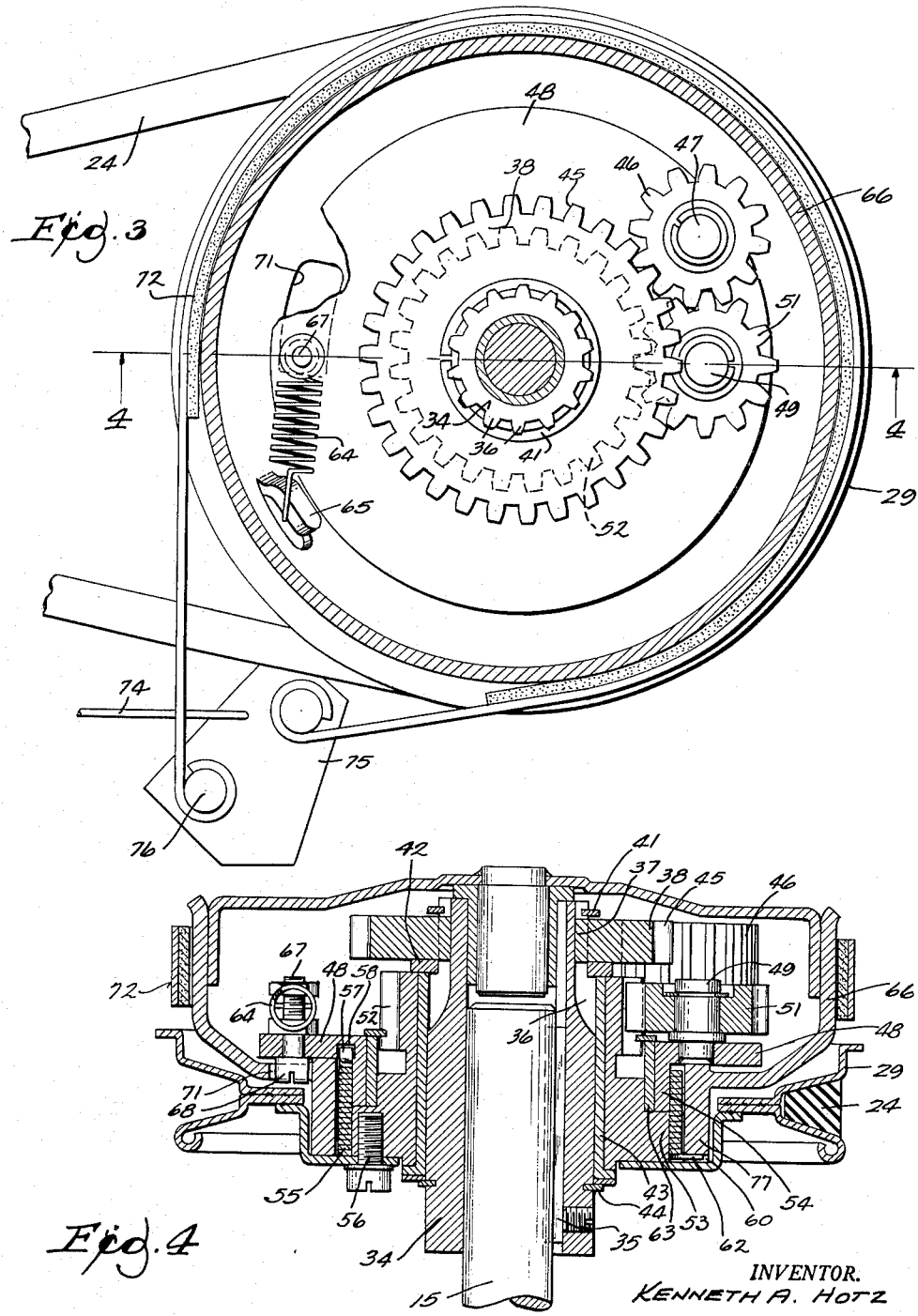

United States Patent Office 3,132,539
Patented May 12, 1964

3,132,539
REVERSING TRANSMISSIONS
Kenneth A. Hotz, Sheboygan, Wis., assignor to Gilson Bros. Co., Plymouth, Wis., a corporation of Wisconsin
Filed Nov. 21, 1960, Ser. No. 70,512
5 Claims. (Cl. 74—792)

This invention relates to improvements in reversing transmissions. While disclosed herein specifically in connection with the power train to the tilling mill of a reversible rotary tiller, the reversing transmission is of general application to other uses.

Rotary tillers typically include a tilling mill having a vertical drive shaft at the upper end of which a belt pulley is driven from a belt trained about a belt pulley on a vertical shaft of an internal combustion engine axially offset from the drive shaft of the tilling mill. In the disclosed embodiment of the present invention, a reversing transmission is substituted for the belt pulley on the drive shaft of the tilling mill. The reversing transmission has a belt pulley which occupies substantially the same position in the transmission housing as the belt pulley of the non-reversible transmission, so as to be readily adapted to be driven by the belt from the engine.

The reversing transmission of the present invention includes novel structure pursuant to which the tilling mill may be readily reversed simply by applying pressure to a single control lever on the handle of the tilling mill. The transmission may be reversed regardless of the forward speed at which the tilling mill is operating and regardless of the load carried thereby. In reversing transmissions embodying the present invention it is unnecessary to manipulate any control mechanism to first declutch the transmission in its forward direction to remove the load therefrom before engaging the transmission in its reverse direction. According to the present invention the load is automatically declutched from the transmission in the course of reversing the transmission.

The reversing transmission of the present invention includes a contractile spring as a clutch member between portions of a planetary gear train. The reversing transmission is controlled by means which releasably locks against rotation a planetary pinion carrier. An important feature of the invention resides in means which is automatically responsive to the control means to expand the contractile spring to disengage the clutch when the control means is applied, thereby relieving the transmission of load prior to the imposition of reverse torque thereon.

Other objects, features and advantages of the invention will appear in the following disclosure in which:

FIG. 1 is a vertical cross section, partly in elevation, through a rotary tiller incorporating a reversing transmission embodying the invention.

FIG. 2 is a horizontal cross section through the transmission housing of the tiller of FIG. 1.

FIG. 3 is an enlarged plan view of the transmission with the cover removed.

FIG. 4 is a cross section taken along the line 4—4 of FIG. 3.

FIG. 5 is a fragmentary side elevation of the transmission.

FIG. 6 is a fragmentary view showing the interlock of a terminal portion of the contractile spring with an anchorage socket in the sleeve of the brake drum.

To exemplify the utility of the reversing transmission, it is disclosed as applied to a rotary tiller 10 which is otherwise typical of such tillers and includes an internal combustion engine 11 mounted on a combined frame and transmission housing 12 having rear wheels 13 and a downwardly projecting housing 14 for the drive shaft 15 of the tilling mill 16.

The rear wheels 13 support the frame 12 through bracket 19 which includes a rearwardly projecting tailpiece 20 on which a drag stake 21 is mounted on the releasable pin 22 for vertical adjustment. The tiller has steering handles 23 by which it is manipulated. Ordinarily, drive shaft 15 is simply provided with a pulley about which is trained a belt 24 which receives power from the drive pulley 25 on the engine shaft 26. According to the present invention, however, such a pulley is replaced by a reversing transmission embodying the present invention. It includes a belt pulley 29 about which the belt 24 is trained, subject to the pressure of idler pulley 30, the position of which is controlled by knob 28 on the control rod 31. Rod 31 is connected to a link 32 pivotally connected to one arm of a bell crank 33 on the other arm of which is idler pulley 30. When knob 28 is pulled, idler pulley 30 moves away from belt 24 to introduce slack into the belt and place the drive in neutral.

The reversing transmission, which is best shown in FIGS. 3, 4 and 5, includes a central sleeve 34 secured to the mill drive shaft 15 by set screw 35. The end of sleeve 34 opposite the set screw is splined at 36 to receive corresponding splines 37 on a driven gear 38 which is thus constrained to rotate with the sleeve 34. Driven gear 38 is held axially at one side to the sleeve 34 by the lock ring 41, the other side of the gear 38 abutting against a spacer collar 42 and a bearing sleeve 43 held axially by the snap ring 44.

Driven gear 38 has teeth 45 which mesh with the teeth of a planetary pinion 46 rotatably supported on its shaft 47 on the planetary gear carrier 48. The planetary pinion carrier 48 is supported for rotation about the axis of the shaft 15 on bearing sleeve 63. Planetary pinion 46 meshes with planetary pinion 51 which has less axial extent than the pinion 46 to avoid conflict with the driven gear 38 and which has teeth which mesh with the teeth on sun gear 52. Pinion 51 is mounted on carrier 48 on its shaft 49.

Sun gear 52 is freely rotatable on the bearing sleeve 43 and has an axially extending sleeve portion 53, the cylindrical surface of which has the same diameter as the central cylindrical surface of a sleeve 54 formed on the planetary pinion carrier 48. It is against these coaxial cylindrical surfaces that the contractile spring 55 may tighten to clutch the sun gear 52 directly to the planetary pinion carrier 48.

The sun gear 52 is fixedly connected to the belt pulley 29 by the bolt 56 (FIG. 4) so as to rotate unitarily with the belt pulley. Inasmuch as the belt pulley 29 is constantly driven in one direction (except when the machine is in neutral), the sun gear will rotate constantly in one direction.

The contractile spring 55 desirably has its coils square in cross section for maximum bearing engagement with the respective cylindrical surfaces of sleeves 53, 54. One terminal end portion of the spring 55 is turned to form a lug 57 which engages a suitable socket 58 formed in the side wall of the planetary pinion carrier 48. The other end of the spring 55 is turned to form a lug 62 which engages a socket 60 formed in sleeve 77 of the brake drum 66.

With the transmission set to drive forwardly, the contractile spring 55 is normally tightened so as to engage its coils concurrently with the respective sleeves 53, 54. The spring is biased in this direction by tension spring 64 which has one end connected to a tongue 65 struck out of brake drum 66 and its other end connected to a bolt or pin 67 mounted on the carrier 48 and which has a head portion 68 which plays in a slot 71 formed in an adjacent side wall of the brake drum 66. The bolt head 68 and slotted portion of the brake drum 66 constitutes a lost motion connection between the brake drum and planetary pinion carrier.

The brake drum 66 is also provided with a brake band 72 which is releasably tightened against the drum 66 by squeezing the lever 73 toward one of the steering handles 23 of the tiller. The lever 73 is connected through a Bowden wire 74 to an oscillatory plate 75 which pivots about a pin 76. Accordingly, tension on the Bowden wire 74 will tighten the band 72 on the brake drum 66. The brake band will be free to slip on the drum 66 when pressure on the lever 73 is released.

For forward drive of the tiller (brake band 72 being released), contractile spring 55 is tightened against the respective sleeves 53, 54 of the sun gear 52 and planet gear carrier 48 (under bias of spring 64), thus to drive the planet gear carrier 48 at the same rate as the sun gear 52. Accordingly, the planet pinions 46, 51 will not rotate on their shafts, but will simply orbit with the carrier 48 to transmit torque to the driven gear 38 and thus rotate in one direction the drive shaft 15.

When it is desired to reverse the direction of rotation of the mill 16, pressure is applied to the lever 73, thus to tighten the band 72 on the brake drum 66, which heretofore has been freely rotating. As soon as the pressure is applied to the brake drum 66, the drag of the brake drum will exert a force on the lug 62 at the end of spring 55 to tend to unwind the spring from engagement with the respective sleeve surfaces 53, 54 and thus automatically declutch these parts. The brake drum 66 desirably has a sleeve 77 which will limit the radial expansion of the spring 55 to prevent disorganization thereof. Accordingly, the sun gear and the planetary pinion carrier are automatically declutched as soon as pressure is applied to lever 73, so as to relieve the transmission from the load. Relative rotation between the brake drum sleeve 77 and the pinion carrier 48 is limited by the play of bolt head 68 in slot 71. Within the limits of such lost motion, the planetary pinion carrier 48 will continue to move a few degrees arcuately under the inertia of its previous movement until the bolt head 68 engages the end of slot 71 to impose braking torque on the carrier 48. When this happens, the carrier will slow down toward dead stop and relative rotation thereof will develop with respect to the sun gear 52 which continues to be driven by belt 24 in the same direction as before. The planetary pinions 46, 51 will now be driven by the sun gear, but in a direction to impose reverse torque on the driven gear 38, thus to reverse the direction in which the shaft 15 will be driven. When the brake drum 66 has been locked in stationary position by the brake band 72, maximum reverse thrust is imposed through the reversing transmission on the shaft 15. The gear ratio of the pinions and gears is desirably such that the mill will rotate slower in reverse than in forward. The tiller will now back up.

When it is desired to drive the tiller forwardly again, pressure on the lever 73 is released, thus to release the brake band 72 from the brake drum 66. Brake drum 66 is now free to turn, as is the planet pinion carrier connected thereto by the lost motion connection aforesaid. Spring 64 is also free to rotate the carrier 48 with respect to the brake drum 66, thus to recoil the contractile spring 55 through pressure on its terminal lug 57 and reclutch the spring 55 against the sleeves 53, 54 of the sun gear and planetary pinion carrier and hence drive the shaft 15 in the forward direction as aforesaid. Here again, there is lost motion between the declutching of the reverse drive and re-establishment of forward drive and the transmission is relieved of load during the interim.

From the foregoing it is clear that the transmission is relieved of load automatically in any change of direction of the drive and that it is unnecessary to place the device in neutral (by manipulating knob 28) during this operation. The knob 28 is used to place the drive in neutral during starting, idling, etc.

I claim:

1. A reversing transmission comprising input and output rotors, a planetary gear train including a driven gear on one of said rotors, a sun gear on the other rotor, planetary reversing pinions meshing with each other and respectively with said driven gear and said sun gear, a planetary reversing gear carrier, a bearing on which said carrier is rotatable, said sun gear and carrier having axially aligned cylindrical sleeves, contractile clutch spring means extending along said sleeves for locking said sleeves together for unitary movement of the carrier and sun gear when the spring is contracted, control means for disengaging the carrier from the sun gear including means automatically responsive to the application of said control means to expand said spring for unlocking said sleeves and thereby release the carrier for relative rotation with respect to the sun gear and reverse the direction in which the driven gear rotates.

2. The device of claim 1 in which said control means comprises a brake and a lost motion connection between the brake and the carrier to permit expansion of said spring before the carrier is locked against rotation with the sun gear.

3. The device of claim 1 in which said control means comprises a brake drum, a connection from said drum to a terminal portion of the spring to tend to unwind the spring when braking pressure is applied to the drum and a lost motion connection from the drum to the carrier to transmit braking pressure to the carrier after the spring starts to expand.

4. The device of claim 3 is which said lost motion connection comprises a circumferential slot in one of said drum and carrier and a pin which plays in said slot and is connected to the other of said drum and carrier.

5. The device of claim 4 in further combination with means yieldably biasing said pin against one end of the slot.

References Cited in the file of this patent

UNITED STATES PATENTS

| | | |
|---|---|---|
| 2,229,654 | Hubbell | Jan. 28, 1941 |
| 2,643,749 | Greenlee | Jan. 30, 1953 |
| 2,905,023 | Morris | Sept. 22, 1959 |